United States Patent [19]

Tsukuda et al.

[11] Patent Number: 5,075,152

[45] Date of Patent: Dec. 24, 1991

[54] POLYETHYLENE COMPOSITE FILM AND LABEL

[75] Inventors: Haruo Tsukuda; Joichi Tabuchi, both of Tokyo, Japan

[73] Assignee: Tonen Sekiyukagaku K.K., Tokyo, Japan

[21] Appl. No.: 697,489

[22] Filed: May 2, 1991

Related U.S. Application Data

[63] Continuation of Ser. No. 403,606, Sep. 6, 1989, abandoned.

[30] Foreign Application Priority Data

Sep. 7, 1988 [JP] Japan .......................... 63-116860[U]
Sep. 7, 1988 [JP] Japan .............................. 63-222522

[51] Int. Cl.$^5$ ..................... B32B 3/18; B32B 7/12; B32B 15/08
[52] U.S. Cl. .................................. 428/204; 428/205; 428/209; 428/212; 428/343; 428/461; 428/913.3; 428/914
[58] Field of Search ................ 428/461, 457, 458, 40, 428/205, 204, 203, 215, 516, 343, 209, 914, 913.3, 212

[56] References Cited

U.S. PATENT DOCUMENTS

| 4,429,015 | 1/1984 | Sheptak .......................... 428/203 X |
| 4,520,053 | 5/1985 | Marentic ......................... 428/461 X |
| 4,591,189 | 5/1986 | Holmen et al. .................. 428/204 X |
| 4,705,714 | 11/1987 | Itaba et al. ......................... 428/215 |

FOREIGN PATENT DOCUMENTS 18893 12/1962 Japan .

Primary Examiner—Thomas J. Herbert, Jr.
Attorney, Agent, or Firm—Kenyon & Kenyon

[57] ABSTRACT

Disclosed are a polyethylene composite film used for displaying materials, balloons and various packaging materials, which is excellent in moistureproofness, clarity, bending properties and pinhole resistance, comprising an oriented polyethylene film in which the degree of crosslinking inwardly decreases across the thickness of the oriented polyethylene film on which printing is performed and a film laminated on the printed surface; and a label suitably used for a polyethylene bottle comprising the above oriented polyethylene film on which printing is performed and an adhesive layer formed on the printed surface.

5 Claims, 1 Drawing Sheet

FIG. IA
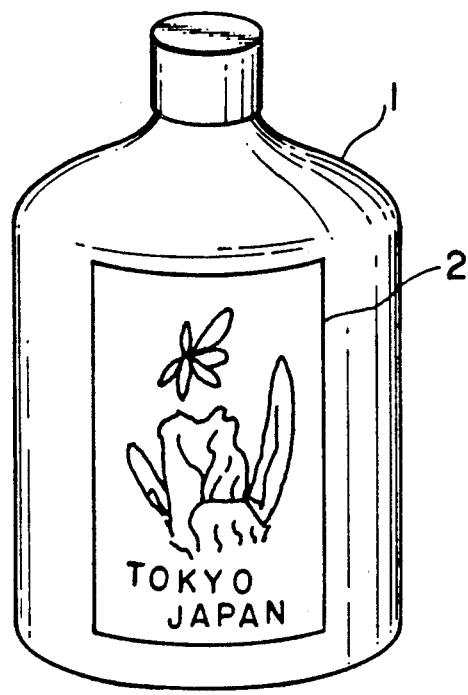
FIG. IB
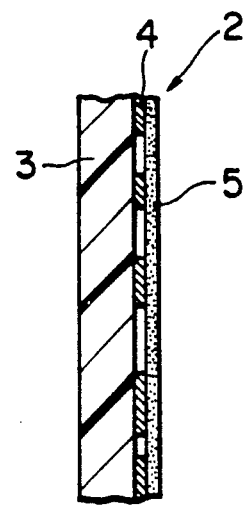
FIG. IC
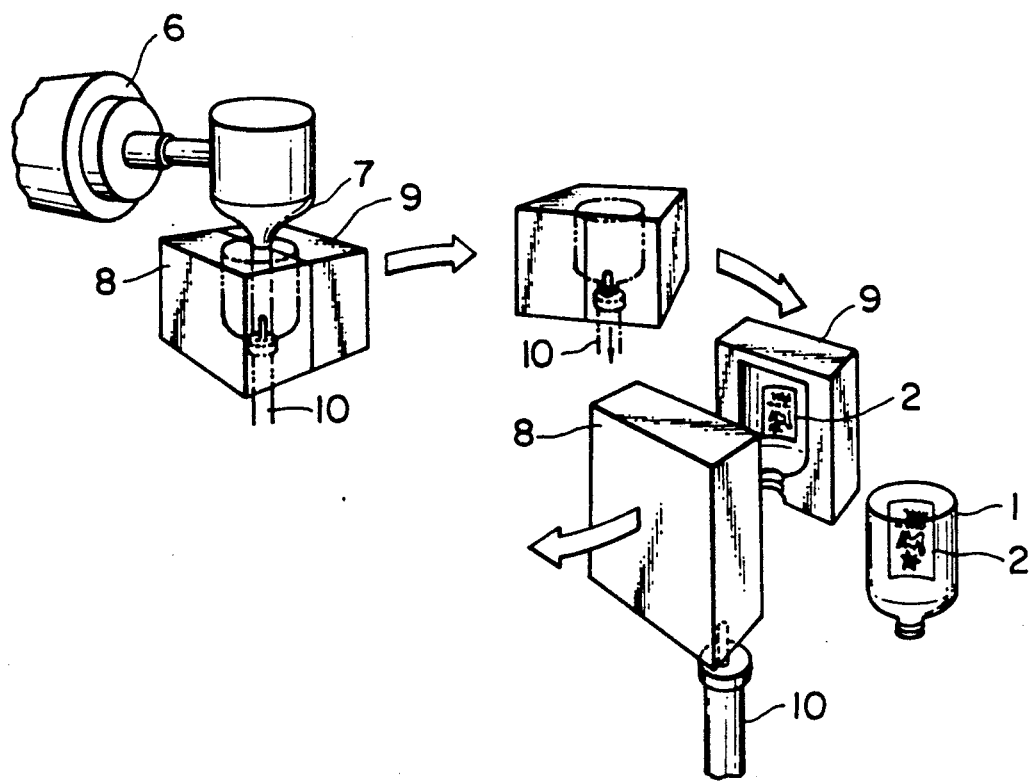

POLYETHYLENE COMPOSITE FILM AND LABEL

This application is a continuation of application Ser. No. 07/403,606 filed Sept. 6, 1989, now abandoned.

BACKGROUND OF THE INVENTION

The present invention relates to a polyethylene composite film and a polyethylene label, more particularly to a polyethylene composite film excellent in luster and color tone of its printed back surface and suitably used for displaying materials such as calendars and posters, ballons and various packaging materials such as high-class wrapping paper imaging wrapping cloths, and to a label composed of the polyethylene composite film and used for the indication of contents by sticking it on containers, particularly on plastic bottles.

Prior-art composite films each having a plastic film on which back surface printing is performed and a laminating material such as a plastic film or the like stuck on the printed surface have been used for various packaging materials, calendars and the like. As the plastic films described above, biaxially oriented polypropylene films or polyester films have been used in respect to clarity.

However, such composite films on which back surface printing is performed have been unsatisfactory in luster and color tone of the printed surface. The use of some adhesives is limited in the formation of the composite films, which has also some problems in operability.

Further, when the composite films are used for various packaging materials, surface layer materials thereof are required to be excellent not only in clarity and in luster and color tone of the printed surface, but also in moistureproofness, in bending properties such as dead fold property and in pinhole resistance after flexocracking. Prior-art materials sometimes lacks these properties.

On the other hand, as labels stuck on containers such as plastic bottles for indicating their contents, there have been used paper or synthetic paper on which printing is performed.

For the labels using such paper, however, top surface printing can not but be performed because of opacity. As a result, the labels have the disadvantage that prints are stained or disappear by the spillover of the contents, or that the labels are broken thereby. There is further the problem that the labels must be formed to a thickness of more than 100 microns due to low rigidity.

SUMMARY OF THE INVENTION

It is therefore a primary object of the present invention to provide a polyethylene composite film on which back surface printing is performed, which composite film is improved in luster and color tone of the printed surface and is easily formed by laminating films on each other.

Another object of the present invention is to provide a polyethylene composite film excellent in moistureproofness, dead fold property and pinhole resistance.

A further object of the present invention is to provide a clear label having a polyethylene film, in which the above-mentioned problems of the prior-art labels are solved, back surface printing can be performed, there can be given an integral, high-class feeling as if curved-surface printing has been performed on a cylindrical container itself, and prints do not disappear or the label is not broken by the spillover of the contents.

Still a further object of the present invention is to provide a polyethylene label suitable for use as a label for in-molding, which label is sufficient in rigidity and strength and therefore is possible to be thinly formed, is resistant to water wetting and contamination, is unnecessary to be stripped on recovery when the label is stuck on a polyethylene bottle, and can be stuck on a bottle at the same time that the bottle is formed by blow molding.

According to the present invention to attain such objects, there are provided a polyethylene composite film comprising an oriented polyethylene film (hereinafter referred to as BOPE film) in which the degree of crosslinking inwardly decreases across the thickness of the BOPE film, printing being performed on one side of said BOPE film, and a film laminated on the printed side; and a label comprising said BOPE film, printing being performed on one side thereof, and an adhesive layer formed on the printed side.

BRIEF DESCRIPTION OF THE DRAWINGS

FIG. 1A is a perspective view showing a label embodying the present invention;

FIG. 1B is a cross sectional view showing a label embodying the present invention;

FIG. 1C is a perspective view illustrating blow molding steps using a label for in-molding of the present invention.

DESCRIPTION OF THE PREFERRED EMBODIMENTS

A BOPE film used in the present invention in which the degree of crosslinking inwardly decreases in the thickness of the film is obtained, for example, by irradiating both the surfaces of a polyethylene stock sheet with electron beams to crosslink it in such a manner that the degree of crosslinking (which can be expressed in terms of gel fraction) inwardly decreases in the thickness thereof, and then biaxially stretching the resulting sheet by a tenter method or stretching the sheet in a longitudinal direction and subsequently in a lateral direction by roller stretching or rolling. The clarity of the film thus obtained is superior to that of prior-art general high density polyethylene films. It is said that the crosslinked oriented polyethylene film obtained by the prior-art method (Japanese Patent Publication No. 18893/1962) in which the film of polyethylene or the like is homogeneously crosslinked by radiation and biaxially stretched is improved in clarity, but insufficient in moistureproofness. However, the film used in the present invention can be improved also in moistureproofness. Hence, when printing is performed on one side (back surface) of such a BOPE film excellent in clarity and moistureproofness and then a film is laminated on the printed surface, a composite film excellent in luster and color tone of the printed surface can be obtained due to the good clarity of the BOPE film and the film laminated on the back surface thereof. In particular, when the same BOPE film as described above over which a metal is deposited is used as the film to be laminated on the back surface of the BOPE film and the deposited surface is bonded to the printed surface, the printed surface is further improved in luster and color tone.

As shown in Examples and Comparative Examples which will hereinafter be described, there are inferior in depth of color tone of the printed surface and in dead fold property a composite film composed of a polyester film (PET film) on a back surface of which printing is performed and another PET film stuck on the printed surface, and a composite film composed of a biaxially oriented polypropylene film (OPP film) on a back surface of which printing is performed and another OPP film stuck on the printed surface.

Thus, the composite films of the present invention are excellent in luster and color tone of the printed surface, in moistureproofness, in clarity, in bending properties such as dead fold property and in pinhole resistance, and suitable for the uses described above.

As described above, the BOPE films used in the present invention are better in clarity than prior-art high density polyethylene films, and back surface printing can be performed thereon. Accordingly, when the label composed of the above-described specific BOPE film on which back surface printing is performed is stuck particularly on a cylindrical bottle, the printed surface is sharply relieved due to the clarity of the BOPE film. As a result, it has been found that there are given a integral feeling as if curved-surface printing is performed on the bottle itself though printing is performed on the BOPE film, and also a high-class feeling.

Further, the above label is sufficient in rigidity and strength, and can be thinly formed. The label is made of polyethylene, printing is performed on the back surface thereof, and the adhesive layer is formed on the printed surface. Hence, when a polyethylene bottle is formed by blow molding, the label is set in a mold for blow molding of the bottle, thereby bonding the surface of the adhesive layer to the blow molding surface of the bottle. The label can thus be suitably used as a label for in-molding. The label has also an advantage of being unnecessary to be stripped on recovery when used for the polyethylene bottle because the label is formed of a material similar to that of the bottle. Further, it does not happen that the printed surface falls off by water wetting or contamination, and therefore the label is resistant to water wetting and contamination. Also, water or stains can be easily swabbed from the label surface.

The composite films and the labels of the present invention will hereinafter be described in detail.

In the present invention, the BOPE film to be subjected to printing is a biaxially oriented polyethylene film in which the degree of crosslinking inwardly decreases across the thickness of the film. The degree of crosslinking is expressed in terms of gel fraction defined by the quantity of insoluble matters which are left undissolved when a sample is extracted with boiling p-xylene. The gel fraction of an inner layer portion where the degree of crosslinking is lowest is preferably less than 5%, and the gel fraction of opposite outer layer portions where the degree of crosslinking is highest is preferably 5% or more. More preferably, the gel fraction of the inner layer portion is 0%, the gel fraction of the opposite outer layer portions is 20 to 70%, both the outer layer portions have the same degree of crosslinking, and there are formed crosslinked layer/uncrosslinked layer/crosslinked layer in the thickness direction of the film, the ratio of the uncrosslinked layer:each of the crosslinked layers being 1:0.1 to 10. The film is preferable to be biaxially stretched at a draw ratio of greater than 3 times in one direction and an area magnification of greater than 9 times. The BOPE film described above may be suitably selected depending on the use.

For example, when moistureproofness, tearability and bending pinhole resistance are required, it is preferable to use a high density polyethylene base with a density of at least 0.935 g/cm$^3$. In particular, it is preferable to have a water vapor transmission rate (y) of not more than a value obtained from the following formula and a haze value of not more than 5%:

$$y = 17 X^{-\frac{1}{2}}$$

in which y represents the water vapor transmission rate (g/m$^2$/24 hours) and X represents the thickness (micron) of an oriented film.

From the standpoint of improving moistureproofness, it is preferable to use polyethylene having a density of at least 0.935 g/cm$^3$, a melt index (JIS K 6760, measured at a temperature of 190° C. and a load of 2.16 kg, hereinafter referred to as MI) of 0.5 to 20 g/10 minutes and a ratio of high load melt index (JIS K 6760, measured at a temperature of 190° C. and a load of 21.6 kg, hereinafter referred to as HLMI)/MI ranging from 40 to 200. Furthermore, a petroleum resin of hydrogenation type is preferably added thereto. The polyethylenes may be used as a mixture thereof.

The BOPE film as described above can be produced, for example, by the processes disclosed in Japanese Patent Unexamined Publication Nos. 174322/1984 and 74819/1986.

For example, each of flat or tubular stock sheets formed by melt extruding polyethylenes having various densities is crosslinked by irradiating both the surfaces of each stock sheet with electron beams in such a manner that the degree of crosslinking inwardly decreases in the thickness direction thereof, and then biaxially stretched at a temperature of not more than the melting point of the polyethylene.

The thickness of the BOPE film is suitably selected depending on the object and the use, but generally in the range of about 10 to 50 microns.

Printing can be performed on the BOPE film by, for example, gravure, offset printing, silk screen printing and flexographic printing.

Examples of the films to be each laminated on the BOPE film on which back surface printing is performed include plastic films, particularly unoriented, uniaxially oriented or biaxially oriented films of polyolefines such as polyethylene and polypropylene, polyesters and polyamides. Of these, the above-mentioned BOPE film, particularly the metal-deposited BOPE film, is preferable, in respect to the further improvement of the luster and the color tone of the printed surface.

Metal deposition on the BOPE film can be performed by vacuum deposition in which the film is placed in a vacuum equipment highly evacuated ($10^{-4}$ to $10^{-8}$ mm Hg) and a metal is heated for evaporation in the equipment, whereby the metal radially scattered is deposited on the surface of the film. There are also available ion plating and sputtering deposition utilizing a phenomenon that a metal constituting a cathode is scattered when discharges are induced under vacuum. Examples of the metals for deposition include Al, Zn, Au, Ag, Cu, Ni, Cr, Ge, Se, Ti and Sn. It is preferable to use Al, because the reflection of the back surface of the film on which back surface printing is performed can be increased to improve the luster and the color tone thereof and Al is excellent in operability and economy.

The thickness of a metal-deposited layer is preferably 200 to 800 angstroms.

If the film is preliminarily treated with corona discharge, the adhesion of the film to the metal can be improved.

The basic structure of the composite film consists in a laminate comprising the BOPE film on which printing is performed and the above-mentioned plastic film or metal-deposited film (including a film other than the BOPE film), the printed surface of the BOPE film being laminated on the plastic film or the deposited surface of the metal-deposited film. However, another BOPE film may be further added as an intermediate layer between the printed surface and the metal-deposited surface.

Moreover, a sealant layer may be provided on the outer layer of the above-mentioned laminated plastic film (including the deposited film).

For the sealant layers, there are used low density polyethylene (LDPE), linear low density polyethylene (LLDPE), ethylene-vinyl acetate copolymer (EVA), ethylene-ethyl acrylate copolymer (EEA), ionomer and the like. The composite film is produced by laminating the material layers on each other by any of (1) dry laminate method, (2) wet laminate method, (3) extrusion coating laminate method and (4) hot melt laminate method.

As adhesives used for lamination, there may be used various adhesives such as urethane-series adhesives, vinyl acetate-series adhesives, acrylic adhesives and rubber-series adhesives.

The thickness of the composite film is suitably selected depending on the object and the use, but generally in the range of about 20 to 200 microns.

A label embodying the present invention will hereinafter be described, based on the drawings.

A label 2 of the present invention is stuck on a plastic (polyethylene) bottle 1 as shown in FIG. 1A and used for the purpose of indicating its contents.

FIG. 1B is a sectional view showing an example of the label 2.

In FIG. 1B, the reference numerals 3, 4 and 5 designate a BOPE film in which the degree of crosslinking inwardly decreases across the thickness of the film, a printed surface formed by performing printing on one side (back surface) of the BOPE film, and an adhesive layer, respectively. As the BOPE film 3 described above, there may be used a film similar to the BOPE film employed in the composite film. The thickness of the BOPE film 3 is similar to that of the BOPE film employed in the composite film and printing is also performed similarly thereto. As an adhesive constituting the adhesive layer 5 on the printed surface 4 of the BOPE film 3, there may be used an adhesive similar to one exemplified in the above-mentioned composite film. In this case, it is particularly preferable to use an adhesive which is possible to be heat bonded to a bottle in a mold when the bottle is formed by blow molding.

Examples of methods for applying the adhesive layer 5 on the printed surface 4 of the BOPE film 3 include a method of applying the adhesive on the printed surface 4 of the film 3 with a roll or the like and a method of coating the printed surface 4 with the adhesive by extrusion. The adhesive layer 5 is usually formed to a thickness of about 5 to 20 microns.

The thickness of the label 2 is suitably selectable depending on the use, but generally in the range of about 50 to 130 microns.

The label 2 can be stuck on the surface of the bottle in the mold at the same time that the bottle is formed by blow molding.

An example of the blow molding will hereinafter be illustrated according to FIG. 1C.

In the blow molding, a polyethylene parison which is cylindrical in a softened state is formed by extruding polyethylene from a parison die 7 through an extruder 6, and then mold parts 8 and 9 are closed. Air is blown into the parison from a blow pin (air blowing member) 10 to expand the parison along an inner configuration of the mold parts 8 and 9. After cooling, the mold parts 8 and 9 are opened and the bottle 1 is taken out. When the air is blown into the parison to expand it, the label 2 is previously set in either of the mold parts 8 and 9. In this drawing, there is shown an example in which another label 2 is set in the mold part 9, after the bottle 1 on which the label 2 has been stuck is taken out, and thus these procedures are circulated.

The composite film of the present invention is excellent in luster and color tone of the printed surface.

The BOPE film as a substrate is excellent in moisture-proofness and clarity. The composite film is therefore also excellent in such properties, and in addition is good in bending properties and in pinhole resistance.

Due to the properties described above, the composite film of the present invention can be applied to various uses, particularly to various packaging materials such as high-class wrapping paper imaging wrapping cloths, displaying materials such as calenders and posters and balloons.

The label of the present invention has back surface printing, and the BOPE film is good in clarity. Hence, the printed surface provide a three-dimensional, clear, integral feeling as if curved-surface printing has been performed on the bottle itself. The label is further resistant to water wetting and contamination.

The label is sufficient in rigidity and strength, and therefore is possible to be thinly formed. Accordingly, the label is economical. In particular, the label is unnecessary to be stripped on recovery when the label is stuck on a polyethylene bottle occupying the main of blow-molded bottles, because the material of the label is identical with that of the bottle. Further, the label of the present invention does not grow moldy, and therefore shows cleanliness for sanitary uses.

Due to the properties described above, the label of the present invention can be employed as labels for various uses, particularly is suitable for a label for in-molding.

The present invention will be described in accordance with the following Examples and Comparative Examples.

EXAMPLE 1

A stock sheet (gel fraction: crosslinked outer layer/uncrosslinked inner layer/crosslinked outer layer = 50/0/50, ratio of each layer in thickness: crosslinked outer layer/uncrosslinked inner layer/crosslinked outer layer = 1:1.75:1, thicknes: 500 microns) formed of high density polyethylene (density: 0.957 g/cm$^3$, MI: 1.0 g/10 minutes) and crosslinked by irradiation of electron beams was stretched 4×6 times at 127° C. to form a biaxially oriented film (hereinafter referred to as BOHD film). The film thus obtained had a haze value of 2.7% and a water vapor transmission rate of 3.6 g/m$^2$/24 hours.

Then, this BOHD film was treated with corona discharge, followed by four-color gravure on the treated surface.

On the other hand, the BOHD film described above was treated with corona discharge, and then aluminium was deposited under vacuum over this treated surface so as to have a thickness of 500 angstroms, thereby forming an aluminium-deposited film.

Then, the above-mentioned printed surface on which gravure was performed of the BOHD film was bonded for lamination to the above-mentioned deposited surface of the aluminium-deposited film (Al-deposited BOHD film) by a dry lamination method using an urethane-series adhesive to form a composite film.

The measurements of luster, visual evaluation and the evaluation of bending property were carried out from the side of the printed surface of the composite film thus obtained. The results are shown in Table 1. This composite film was further used for packaging a box-shaped article. As a result, this composite film was also excellent in bending property (dead fold property). Furthermore, the composite film was very small in the number of pinholes after flexocracking and hence was excellent in pinhole resistance.

EXAMPLES 2 to 7

Composite films were obtained in the same manner as with Example 1 except that an Al-deposited PET film (12 microns), a PET film (12 microns), an OPP film (20 microns) and a LLDPE sealant film were used as the films for lamination on the printed surface of the BOHD film. The results of the measurements of luster, visual evaluations and the evaluations of bending property of the respective composite films are also shown in Table 1.

COMPARATIVE EXAMPLES 1 AND 2

In Example 1, a PET film and an OPP film were used in place of the BOHD film and four-color gravure was performed on one side of each film. On the printed surfaces were similarly laminated a PET film (12 microns) and an OPP film (20 microns), respectively, thereby forming composite films. The results of the measurements of luster, visual evaluations and the evaluations of bending property of the respective composite films are also shown in Table 1.

Test methods employed herein are as follows:

(1) Visual Evaluation

Three observers judged the color tone of the printed surfaces. A very excellent sample in which the deep color tone was felt was indicated by ⊙, an excellent sample by ◯, an ordinary sample by Δ, and a somewhat poor sample by X.

(2) Bending Property (Dead Fold Property)

When a composite film sample was folded double, a sample having a restoring angle of less than 90 degrees was indicated by ◯, a sample having a restoring angle of 90 to 180 degrees by Δ, and a sample not creased by X.

TABLE 1

| | Layer Structure of Film (BOHD-Printed Surface/Lamination Film) | Lamination Method | Visual Evaluation | Bending Property |
|---|---|---|---|---|
| Example No. | | | | |
| 1 | BOHD/Al-deposited BOHD | Dry lamination | ⊙ | ◯ |
| 2 | BOHD/Al-deposited PET | Dry lamination | ◯ | Δ |
| 3 | BOHD/PET | Dry lamination | ◯ | Δ |
| 4 | BOHD/OPP | Dry lamination | ◯ | Δ |
| 5 | BOHD/BOHD*/Al-deposited BOHD | Dry lamination/dry lamination | ⊙ | ◯ |
| 6 | BOHD/Al-deposited BOHD/LLDPE* | Dry lamination/dry lamination | ⊙ | ◯ |
| 7 | BOHD/BOHD* | Dry lamination | ⊙ | ◯ |
| Comparative Example No. | | | | |
| 1 | PET printed surface/PET | Dry lamination | Δ | X |
| 2 | OPP printed surface/OPP | Dry lamination | X | X |

BOHD*: No printed surface
LLDPE*: Sealant layer

EXAMPLE 8

The BOHD film obtained in Example 1 was treated with corona discharge, and then four-color gravure was performed on this treated surface.

The printed surface of the BOHD film was coated with 5 g/m$^2$ of an ethylene-vinyl acetate (EVA) emulsion. After drying, the resulting film was cut to an elliptical form with a major axis 100 mm long and a minor axis 60 mm long to form a label. The label thus obtained was set in a mold for blow molding. High density polyethylene was formed into a 200 ml bottle by blow molding, and as the same time the label was stuck on the surface of the bottle as a label for in-molding.

The label thus obtained had a clear back surface print and an integral feeling as if curved-surface printing had been performed on the bottle itself. Water or stains could be easily swabbed from the label, and the contamination and the breakage of the label were avoided.

We claim:

1. A polyethylene film comprising:
    an oriented polyethylene film having a thickness and a first side surface and a second side surface wherein crosslinking decreases in degree inwardly across the thickness from both said first and second side surface;
    printing formed on said first side surface of said oriented polyethylene film; and
    a second film laminated on said first side surface of said oriented polyethylene film having said printing, said second film being a film selected from the group consisting of plastic film and metal deposited plastic film.

2. The polyethylene composite film as claimed in claim 1 wherein said oriented polyethylene film has a structure across its thickness comprising a first crosslinked polyethylene layer, a second crosslinked polyethylene layer, and a non-crosslinked polyethylene layer located between said first and second crosslinked polyethylene layers.

3. The polyethylene composite film as claimed in claim 1 wherein said second film laminated on said first side surface of said oriented polyethylene film having said printing is a second oriented polyethylene film having an inner side surface adjacent said first side surface of said oriented polyethylene having film said printing thereon and said inner side of said second oriented polyethylene film has an aluminum layer deposited thereon.

4. The polyethylene composite film as claimed in claim 1 wherein said second laminated film has an outer surface and said outer surface has a sealant layer deposited thereon.

5. A label comprising an oriented polyethylene film having a thickness and a first side surface and a second side surface wherein crosslinking decreases in degree inwardly across the thickness from both said first and second side surface;

printing formed on said first side surface of said oriented polyethylene film; and an adhesive layer formed on said first side surface of said oriented polyethylene film having said printing.

* * * * *